June 3, 1941.   C. A. SWANSTROM   2,243,923
ANCHOR NUT STRUCTURE AND THE MANUFACTURE THEREOF
Filed May 24, 1938   2 Sheets-Sheet 1
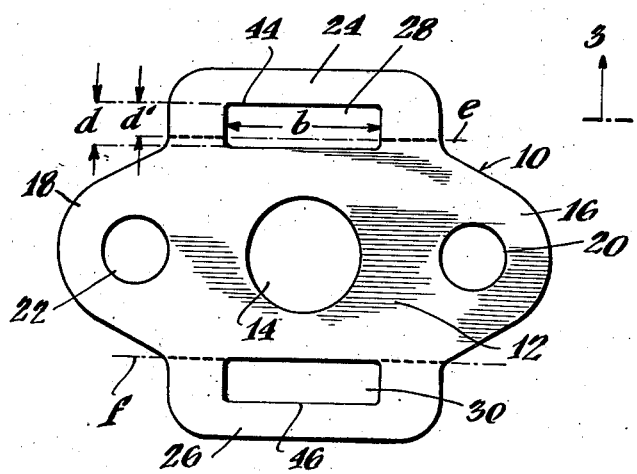
INVENTOR
Carl A. Swanstrom
BY
ATTORNEY

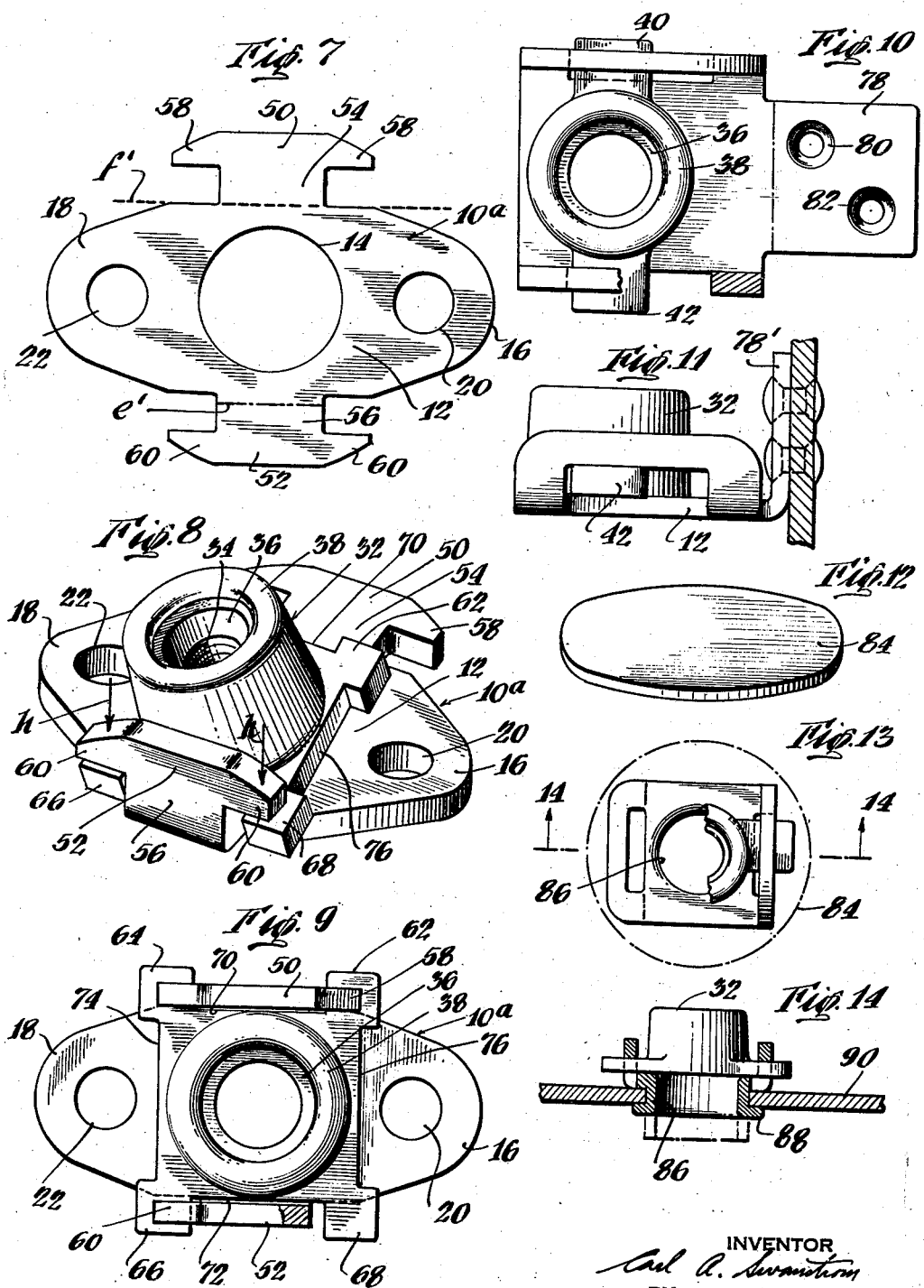

Patented June 3, 1941

2,243,923

UNITED STATES PATENT OFFICE 2,243,923

ANCHOR NUT STRUCTURE AND THE MANUFACTURE THEREOF

Carl A. Swanstrom, Maplewood, N. J., assignor to Elastic Stop Nut Corporation, Elizabeth, N. J., a corporation of New Jersey Application May 24, 1938, Serial No. 209,662

13 Claims. (Cl. 29—148)

The present invention relates to nut structures and the manufacture thereof and has particular reference to two-piece nut structures of the kind in which a nut is held in assembled relation to have limited movement in an anchor member which in turn is adapted to be secured to a member to be fastened to another by cooperation of the nut with a bolt or screw threaded therethrough. Nut structure assemblies of the above kind are usually referred to in the trade as anchor nuts. Still more particularly the invention relates to anchor nut structures in which the anchor member is adapted to be secured to relatively thin plate members through which the bolt or screw cooperating with the nut portion of the anchor nut structure is adapted to pass from the side of the plate remote from the side to which the anchor nut structure is attached.

The invention further relates to improved methods of assembly of the nut and anchor member portions of anchor nut structures of the kind under consideration, whereby to permit limited lateral movement of the nut, but not rotation, relative to the anchor member and with the lateral movement of the nut subject to a desired predetermined degree of restraint.

In accordance with the present invention the nut structure consists of a nut proper, preferably of the self-locking type, and an anchor member, preferably of thin sheet metal, having portions adapted to be bent into inter-engaging relation with portions of the nut to hold the two parts in desired assembled relation and having a further portion or portions adapted to be used to secure the assembled structure to a member to be fastened. Further in accordance with the invention, the portions of the anchor member which are bent into inter-engaging relation with portions of the nut are either bent or subjected to further operation after bending so as to produce a desired friction producing pressure between the assembled parts, to thereby prevent free and wholly unrestrained lateral movement of the nut relative to the anchor member within the limited range of such lateral movement of the nut.

The general objects of the invention are to provide new and improved anchor nut structure which will permit limited lateral movement of the nut element of such a structure permanently secured in place on a part to be fastened thereby; to provide anchor nut structure which is simple and cheap in construction and which provides relatively great strength with the minimum of weight; to provide anchor nut structure which may be assembled before attachment to the element to be fastened thereby or assembled with facility after the anchor member has been secured to such element; to provide an anchor nut structure which permits ready removal of a nut assembled in a permanently secured anchor member for insertion of a replacement nut; to provide an anchor nut structure in which the limited lateral motion of the nut in the anchor member is restrained by frictional resistance between parts of the structure to an extent such that while laterally movable within the anchor member, the nut will not shift therein due either to gravity or the inertia of the nut; and to provide a novel method of assembling the nut and anchor member portions of an anchor nut structure by means of which the desired frictional resistance between the component parts of the assembly is attained by bending, or subjecting to pressure after bending, the nut retaining portions of the anchor member which are bent into inter-engaging relation with the nut.

Other and more detailed objects of the invention, the manner in which they are attained, and the advantages to be derived from use of the invention, will best be understood from consideration of the ensuing portion of this specification, descriptive of different forms of structure and methods of fabrication thereof for carrying the invention into effect, taken in conjunction with the accompanying drawings forming a part hereof, in which:

Fig. 1 is a plan view of a blank for making one form of anchor member according to the invention;

Fig. 2 is a plan view of a nut adapted to be assembled with the blank shown in Fig. 1;

Fig. 3 is a section taken on the line 3—3 of Fig. 2 and showing a preferred form of self-locking nut structure;

Fig. 4 is a perspective view showing the nut illustrated in Fig. 2 partly assembled in the anchor member of Fig. 1;

Fig. 4a is a fragmentary perspective view of a variation of structure shown in Fig. 4.

Fig. 5 is a top plan view broken away in part showing the completely assembled anchor nut unit;

Fig. 6 is a section taken on the line 6—6 of Fig. 5;

Fig. 7 is a view similar to Fig. 1 showing a different form of anchor member blank;

Fig. 8 is a view similar to Fig. 4 showing the anchor member and its cooperating nut in partially assembled relation;

Fig. 9 is a top plan view broken away in part and showing the completely assembled nut unit of Fig. 8;

Fig. 10 is a top plan view broken away in part of another form of assembled nut unit;

Fig. 11 is a side elevation of still another form of assembled nut unit;

Fig. 12 illustrates a blank from which still another form of anchor member may be formed;

Fig. 13 is a top plan view broken away in part showing this latter form of unit in partially assembled condition; and Fig. 14 is a view taken along the line 14—14 of Fig. 13 and showing this form of unit in finally assembled and mounted state.

Referring now more particularly to Figs. 1 to 6, the anchor member indicated generally at 10 is formed by stamping or otherwise forming from thin sheet metal stock, preferably of some light weight metal such as aluminum, magnesium or alloys thereof. Fig. 1 illustrates the form in which the blank is cut and by reference to this figure it will be observed that the blank comprises a central base portion 12 having an aperture 14, from which central portion two oppositely extending anchoring lugs 16 and 18 project. These lugs are provided respectively with apertures 20 and 22 for rivets or other suitable elements for fastening the anchor member to a part such as a plate or the like which is to be fastened by the bolt and nut connection. For convenience these lugs may be considered as projecting longitudinally of the blank. The blank is further provided with two laterally projecting ears 24 and 26 which are in the form of loops providing the slots 28 and 30 respectively.

The nut for use with the anchor member just described, and illustrated in Figs. 2 and 3, comprises a nut body 32 having a threaded bore 34 the upper end of which is counterbored to provide a recess in which an elastic locking insert 36, preferably made of vulcanized fibre or its equivalent, is secured by crimping the top edge 38 of the nut body. The external sectional contour of the nut body may be of any desired form but is advantageously circular as indicated in Fig. 2. The base of the nut body has a flange portion in the form of two oppositely disposed lugs or projections 40 and 42 which as indicated are relatively thin and the lateral dimension $a$ of which is materially less than the length $b$ of the openings 28 and 30 in the anchor member.

The thickness $c$ of the lugs on the nut is advantageously, although not necessarily, made the same as the width $d$ of the openings 28 and 30 in the anchor member. The diameter of the opening 14 in the anchor member is made somewhat larger than the bore 34 of the nut.

In assembling the nut and anchor member one of the ears of the anchor member, for example the ear 24, is advantageously bent upwardly to the position shown in Fig. 4 along a line indicated by the dotted line $e$ in Fig. 1, so that a part of the opening 28 lies in the plane of the bent ear 24 while a part of the opening lies in the plane of the base portion 12. With the ear 24 bent up in this manner, and assuming that the thickness $c$ of the nut flange 40 is equal to the width $d$ of the opening 28, it will be evident that in order to insert the lug in the opening it will be necessary to direct the nut into the opening angularly as indicated in Fig. 4. With the nut angularly inserted in this manner the lug 40 is pushed through the opening 24 until the body of the nut abuts against the ear 24. As will be seen from Fig. 5, the width of the base portion 12 of the anchor member between the lateral ears is such that with the nut body pushed over into contact with ear 24 the opposite ear 26 may be bent upwardly over the opposite nut lug 42. This however can be done only by pressing the nut down flat against the base portion 12 of the anchor member. The slight distortion necessary to do this will result in the upper faces of the lugs 40 and 42 of the nut being in frictional contact with the edges 44 and 46 of the respective openings 28 and 30. Obviously the bottom face of the nut body will also be in frictional contact of the surface of the central body portion 12 of the anchor member. If, as assumed, the thickness of the nut lugs is made the same as the width of the openings in which they are received, the ear 26 when it is bent up to engage its cooperating lug is advantageously bent along the line indicated at $f$ in Fig. 1 so that the entire width of the opening lies in the plane of the upturned ear. If this were not done, the lug 42 would have to be bent down in order to be inserted and the resulting friction contact between the two parts for restraining the motion of the nut might be too severe and operate virtually as a lock rigidly positioning the nut in one position with respect to the anchor member, which is not desired.

For clarity of illustration, the distance from the line $e$ in Fig. 1 to the inner edge of the slot 28 is shown somewhat exaggerated, and it will be appreciated that regardless of the relation of the width of the slot 28 to the thickness of the lug 40, the desired friction between the parts will be obtained by bending the ear 24 along a line such that the portion $d'$ of the slot 28, which lies in the plane of the ear 24 after the bending operation, is but a few thousandths of an inch less than the thickness $c$ of the lug.

The structure just described provides many features of practical advantage.

The limited movement of the nut in the anchor member permits it to be readily centered with respect to the opening through which the engaged bolt or stud passes, even though the anchor member is not fixed to the part to be secured with the opening 14 in the anchor member exactly aligned with the bore or other opening through which the bolt passes in such part. At the same time, the restrained movement of the nut in the anchor member acts to retain the nut in its proper position with respect to the bolt hole once it has been centered. This is particularly advantageous where after the parts to be secured together have once been assembled, the anchor nut structure becomes a "blind" fastening means, that is, one which is inaccessible. This feature is also of material advantage in applications generally where the anchor member is secured to a vertical surface so that if the nut were completely free to move in the anchor member it would always drop under the influence of gravity to the lowest possible position in the anchor member immediately upon withdrawal of the bolt from the nut.

The specific form of construction embodying the use of ears bent up so that they lie in planes substantially normal to the plane of the body portion of the anchor member also has numerous practical advantages.

The upstanding ears act in effect as bridge members providing relatively great strength and rigidity to the anchor member even though the latter is made from relatively weak metal of very thin section. For some applications, notably aircraft use where weight is of great importance, this enables anchor members having sufficient strength to be made of relatively weak, light metal of very thin section with consequent saving in weight of the entire nut assembly in the entire anchor nut unit.

For instances where a strong connection is desired, which requires use of a steel or other heavy metal nut, and at the same time minimum weight is desired, the construction is most advantageous, since a steel nut of small volume and consequently of low weight may readily be used with an extremely light weight anchor member to insure minimum weight for the whole structure.

Also, the upstanding ears are readily engagable by pliers or the like and either one, if bent outwardly through a relatively small angle, may be brought out of engagement with the nut for removal and replacement of the nut. Further, because of the use of the upstanding ears, the anchor member may readily be fixed in semi-finished form, as for instance in the condition illustrated in Fig. 4, to the part to which it is to be attached and the nut inserted and secured in assembled position at some time thereafter, simply by bending up one of the ears to its upstanding position. This is of importance particularly in cases where self-locking nuts of the kind shown in Fig. 3 are to be employed and the part to which the anchor member 12 is fastened must be welded or otherwise heated after the anchor member is in place. Under such conditions the elastic material of the locking insert 36 in the nut might be damaged by heat if it were attached in assembled condition at the time the anchor member was fastened and before the parts were subjected to the required heat.

In addition to providing strength to the anchor member it will further be evident that the bridge-like ears passing over the lugs on the nut provide relatively very strong means for preventing displacement of the nut away from the base of the anchor member under the influence of axial thrust from a bolt.

Referring now to Figures 7 to 9, a different embodiment of the invention which employs essentially the same underlying principles as are embodied in the form just described, is illustrated.

In the present embodiment the anchor member 10ª, in blank form shown in Fig. 7, comprises a central portion 12 having aperture 14 therein and longitudinally extending lugs 16 and 18, with their respective apertures 20 and 22, as in the form previously described. In the present embodiment, however, the laterally extending ears 50 and 52 are of different form than that previously described and comprise projections of generally T-shape form extending laterally from the central base portion of the anchor member.

These projections have stem portions 54 and 56 respectively from which fingers 58 and 60 project longitudinally of the anchor member.

For use with this anchor member a nut is employed which as to the construction of the main body portion is similar to that previously described but which has a different form of lug or flange projection from the main portion of the nut body. As will be seen from Figs. 8 and 9 the nut is provided with a relatively thin base flange cut to provide four projections 62, 64, 66 and 68 at the corners of the nut. Between the projections 62 and 64 the flange is recessed as indicated at 70 and between projections 66 and 68 it is recessed as shown at 72. Advantageously, for purposes of symmetry and also reduction in weight a similar recess 74 is formed in the flange between the projections 64 and 66 and recess 76 is formed between projections 62 and 68.

From Figs. 8 and 9 and from the previously described form of nut structure, it will be evident that the present form of construction may be assembled in the same way as the form previously described to secure the same result. In order to secure the restrained lateral movement of the nut in the anchor member the latter is advantageously first bent along the line e' so that the nut is inserted as shown in Fig. 8, with slight angular displacement. It is thereafter pressed into contact with the base portion of the anchor member and the ear 50 bent up along line f' over the corner projections 62 and 64. As will be evident from Fig. 8, the length of recesses 70 and 72 is greater than the width of the stems 54 and 56 of the ears, so that when the latter are bent into position with the fingers overlying the projections on the nut, the nut will have limited movement longitudinally of the anchor member. Likewise, the depth of the recesses is such that the distance across the base of the nut is less than the distance between the upstanding ears, to provide for lateral play of the nut.

While for the purpose of obtaining predetermined frictional contact for locating the nut in the anchor member the bending of the ears in the manner hereinbefore described is advantageously employed, other steps may be taken to accomplish the desired result, which steps may be in addition to or in lieu of the previously described procedure. For example, as illustrated in Fig. 4a one or both of the ears may be bent upwardly along a line such that the height d' of the slot is greater than the thickness of the projection on the nut, and the ear slightly deformed, after insertion of the nut, to bring it into contact with the projection, by application of force from a punch or other suitable tool along the line of arrow g.

In the same manner, fingers 58 or 60, or both, of the form shown in Figs. 7 to 9 may be bent down by application of force along lines indicated by arrows h if the vertical height of either or both of the neck portions 54, 56, is greater than the thickness of the cooperating projection on the nut. Application of force along lines g, h, may also, if desired, be employed as a final check operation to insure frictional engagement of the parts regardless of the specific manner in which the ears are first bent up.

In the forms previously described, the anchor member is intended to be fixed to the part to be fastened on opposite sides of the nut. Other specific arrangements for fastening the anchor member may be employed, as for instance as shown in Fig. 10, in which the form of nut and cooperating anchoring ears shown in Figs. 1 to 6 are employed with an anchor member having but a single longitudinally projecting lug 78 provided with apertures 80 and 82, for the reception of suitable fastening rivets or equivalent elements.

Fig. 11 illustrates the form of anchor member shown in Fig. 10 modified by bending the lug 78' out of the plane of the base portion 12 of the anchor member to provide an anchor nut adapted to receive a bolt or stud parallel to the face to which the anchor member is fastened.

In Figs. 12 to 14, still another form of anchor member is illustrated, which is adapted for so-called eyelet fastening to a plate structure. In this form a blank 84 is drawn or punched to provide an anchoring lug in the form of a circular tubular portion 86 adapted to be riveted over as shown at 88, to secure the anchor member to the part 90 through which the bolt is to pass. The remaining flat portion of the blank surrounding the tubular part 86 is then stamped or otherwise formed to desired shape, which, in the embodiment illustrated, is the same as that shown in Fig. 1.

It will of course be evident, that the specific form of anchor member, with respect to portions by which it is to be fastened to the part to be held, may be combined with any of the illustrated forms of nut retaining ears or any modifications thereof falling within the scope of the invention. It will further be evident, that the precise forms of construction herein illustrated and described by way of example, may be varied without departing from the scope or spirit of the invention, and that certain features of the invention may be employed to the exclusion of others. It is accordingly understood that the invention is to be considered as embracing all that falls within the scope of the appended claims when they are construed as broadly as is consistent with the state of the prior art.

What is claimed is:

1. Anchor nut structure comprising a main body portion and a flange portion relatively thin as compared with the body portion and projecting laterally from the base of the main body portion, and an anchor member of thin sheet metal having an apertured base portion underlying the nut, an anchoring portion extending from said base portion and nut securing portions at opposite sides of said base portion, said nut securing portions being bent upwardly from the base portion and parts of said upwardly extending portions overlying certain parts of the flange portion of the nut in predetermined pressure contact with the upper surface of the flange portion to hold the nut and anchor member in assembled relation and to permit limited movement of the nut relative to the anchor member, said limited movement being restrained by friction between the parts due to said pressure contact.

2. A two-piece anchor nut structure consisting of a nut having a main body portion of circular cross-section and a laterally projecting flange portion, and an anchor member having an apertured base portion underlying the nut, an anchoring portion projecting from said base portion, and nut securing portions at opposite sides of said base portion, said nut securing portions extending upwardly at substantially right angles to the plane of said base portion and said upwardly extending portions having surfaces overlying certain parts of the flange portion of the nut, the distance between said upwardly bent portions being greater than the diameter of the nut and said portions being shaped to permit lateral movement of the nut between said upturned portions in the plane of said base portion.

3. A two-piece anchor nut structure consisting of a sheet metal anchor member and a flanged nut, certain portions of said anchor member being bent upwardly and parts of said upwardly extending portions overlying the flange portion of the nut to retain the nut within the anchor member with limited movement in all lateral directions and to restrain the nut in its limited lateral movement due to pressure contact of substantially fixed predetermined value between said overlying parts of the anchor member and the flange portion of the nut.

4. A two-piece anchor nut structure consisting of a nut having a main body portion and diametrically opposed lugs projecting laterally from said body portion, and a sheet metal anchor member having a central apertured base portion underlying the nut, an anchor portion extending from the central apertured portion, and nut retaining portions comprising apertured ears bent upwardly from said central apertured portion at opposite sides of the nut, said lugs projecting respectively through said apertured ears and the portions of the ears overlying the lugs being bent toward the base portion in predetermined substantially fixed pressure contact with the lugs.

5. Anchor nut structure comprising a nut having a main body portion and diametrically opposed lugs projecting laterally from said body portion, and a sheet metal anchor member having a central apertured portion underlying the nut, an anchor portion extending from the central apertured portion, and nut retaining portions comprising apertured ears bent upwardly from said central apertured portion at opposite sides of the nut, said lugs projecting respectively through said apertured ears, the distance between said bent up ears being greater than the distance across the body portion of the nut and the lengths of the apertures being greater than the width of said lugs whereby to permit limited movement of the nut in any lateral direction with respect to the anchor member.

6. Anchor nut structure comprising a nut having a main body portion and a flange portion projecting laterally from said body portion, said flange portion being recessed at opposite sides of the nut, and a sheet metal anchor member comprising an apertured central portion underlying the nut, an anchoring portion extending from said central portion, and opposed nut retaining projections, said projections being bent upwardly from said central portion through the recesses in the flange portion of the nut and each of said projections having a head providing surfaces engaging the upper face of the flange portion of the nut at either side of the recess through which it passes.

7. A sheet metal anchor member for use with nuts of the kind having relatively thin lugs projecting from the opposite sides of the bottom of the main body portion of the nut, said member comprising an apertured central portion adapted to underlie a nut, an anchoring portion extending from said central portion, and nut retaining portions projecting from opposite sides of said central portion, each of said projections constituting an apertured ear adapted when bent up substantially at right angles to the plane of the central portion to provide a relatively narrow and elongated loop encircling one of said lugs to retain the nut in assembled relation in the anchor member.

8. A sheet metal anchor member for use with nuts of the kind having relatively thin lugs projecting from the opposite sides of the bottom of the main body portion of the nut, said member comprising an apertured central portion adapted to underlie a nut, an anchoring portion extending from said central portion, and nut retaining portions projecting from opposite sides of said central portion, each of said projections being of generally T-shaped form to provide a head portion adapted to engage the upper surface of one of said lugs to retain the nut in assembled relation with the anchor member.

9. The method of producing two-piece anchor nut structures of the kind in which a flanged nut is retained in a sheet metal anchor member which consists in forming a nut having laterally projecting flange portions, forming a sheet metal anchor member to have a central portion and opposed nut retaining portions each shaped to provide an opening when the nut retaining portion is bent upwardly into a plane approximately at right angles to the plane of the central portion, bending one of said portions upwardly into such plane along a line such that the height of the opening is slightly less than the thickness of the flange portions of the nut, placing the nut over said central portion with the projecting flange portion at one side of the nut extending through the bent up nut retaining portion and with the bottom surface of the nut at an angle to the plane of the central portion of the anchor member, forcing the bottom surface of the nut into contact with the central portion of the anchor member and thereafter bending the remaining nut retaining portion of the anchor member over the remaining projecting flange portion of the nut.

10. A two-piece anchor nut structure consisting of a flat bottomed nut having opposed laterally projecting lugs projecting from the base portion thereof and a sheet metal anchor member bent to U-shaped form in transverse cross-section, the side walls of said anchor member having openings therein through which said lugs project and portions of the side walls above the lugs being bent toward the base of the anchor member to produce predetermined frictional contact between the base of the nut and the base portion of the anchor member.

11. A two-piece anchor nut structure consisting of a nut having a main body portion and a laterally projecting flange portion, and an anchor member having an apertured base portion underlying the nut, an anchoring portion extending from said base portion and nut retaining portions extending upwardly from opposite sides of said base portion, the flange portion of the nut engaging said upwardly extending portions to hold the nut and anchor member in assembled relation and to permit limited movement of the nut relative to the member in the plane of said base portion.

12. A two-piece anchor nut structure consisting of a nut having a main body portion and a laterally projecting flange portion, and an anchor member having an apertured base portion underlying the nut, an anchoring portion extending from said base portion and nut retaining portions extending upwardly from opposite sides of said base portion, said upwardly extending portions and surfaces thereon engaged with pressure contact by the upper surface of the flange portion of the nut to hold the nut and the anchor member in assembled relation, and to permit limited movement of the nut relative to the anchor member in the plane of said base portion, said limited movement being restrained by friction between the parts due to said pressure contact.

13. A two-piece anchor nut structure consisting of a nut having a body portion and opposed flange portions projecting laterally from the base of said body portion, and an anchor member having a base portion and nut retaining portions extending upwardly from said base portion substantially at right angles thereto, the opposed flange portions of the nut extending through said upwardly extending portions of the anchor member and engaging retaining surfaces thereon with pressure contact, said nut having limited lateral movement relative to the anchor member in the plane of said base portion and said movement being restrained by friction due to said pressure contact.

CARL A. SWANSTROM.